(12) United States Patent
Wu et al.

(10) Patent No.: US 11,621,652 B2
(45) Date of Patent: Apr. 4, 2023

(54) ULTRATHIN TRIBOELECTRIC NANOGENERATOR AND APPLICATION THEREOF

(71) Applicant: National Taiwan University of Science and Technology, Taipei (TW)

(72) Inventors: Chang-Mou Wu, Taipei (TW); Mohana Rani Gokana, Taipei (TW)

(73) Assignee: National Taiwan University of Science and Technology, Taipei (TW)

( * ) Notice: Subject to any disclaimer, the term of this patent is extended or adjusted under 35 U.S.C. 154(b) by 0 days.

(21) Appl. No.: 17/483,977

(22) Filed: Sep. 24, 2021

(65) Prior Publication Data

US 2022/0278631 A1 Sep. 1, 2022

(30) Foreign Application Priority Data

Feb. 26, 2021 (TW) .................................. 110107044

(51) Int. Cl.
H02N 1/04 (2006.01)
(52) U.S. Cl.
CPC ...................................... H02N 1/04 (2013.01)
(58) Field of Classification Search
CPC .................................... H02N 1/04; H02N 1/00
USPC .................................................. 310/309, 310
See application file for complete search history.

(56) References Cited

U.S. PATENT DOCUMENTS

| | | | |
|---|---|---|---|
| 2009/0069736 A1* | 3/2009 | Park .................... | A61L 26/0019 602/46 |
| 2014/0246950 A1* | 9/2014 | Wang ...................... | H02N 1/04 310/310 |
| 2014/0246951 A1* | 9/2014 | Wang ...................... | H02N 1/04 310/310 |
| 2018/0316281 A1* | 11/2018 | Lee ........................ | D02G 3/441 |
| 2019/0359969 A1* | 11/2019 | Rodriguez Murillo ...................... A61L 27/025 |
| 2022/0278631 A1* | 9/2022 | Wu .......................... | H02N 1/04 |

* cited by examiner

*Primary Examiner* — Ahmed Elnakib
(74) *Attorney, Agent, or Firm* — Karin L. Williams; Alan D. Kamrath; Mayer & Williams PC

(57) ABSTRACT

Present invention is related to an ultrathin triboelectric nanogenerator having a positive assembly layer and a negative assembly layer electrically connected together. The positive assembly layer comprises a positive layer and a first electrode. The negative assembly layer comprises a negative layer and a second electrode. The said first electrode and the said second electrode are electrically connected with each other. The positive layer could be a foam layer with under 90 μm thickness and less than 60 μm pore size. The present invention firstly provides the ultrathin triboelectric nanogenerator with PU foam as the positive layer which could achieve better electrical performance compared to any conventional triboelectric nanogenerator.

14 Claims, 20 Drawing Sheets

ULTRATHIN TRIBOELECTRIC NANOGENERATOR AND APPLICATION THEREOF

FIELD OF INVENTION

The present invention is a nanogenerator assembly and its applications thereof, especially to an ultrathin triboelectric nanogenerator assembly generating power by mechanical contact between surfaces of each element.

BACKGROUND OF THE INVENTION

Obtaining applicable energy, like electrical energy converted from inapplicable environment energy is a clean and sustainable way for solving energy crisis. Massive studies have proven that obtaining energy triboelectricaily has became one of the potential energy substitutions for our future. Triboelectric Nanogenerator (TENG), is a mechanism based on the a friction power generation effect or triboelectric effect, which mechanical force can be converted into electric energy and is able to be output as applicable energy with high efficiency, high power, light weight and low cost of advantages.

Triboelectric effect is a process of generating electric power through contacting two different materials surface where opposite charges transfer between the two materials. Further connecting with any mechanical device or sensor for outputting the electric power generated from the triboelectric effect.

However, the thickness is one of greatest difficulties or problems for the conventional TENG which make it became not so ideally and lack of competitiveness for applying on real commercially products or any other applications. Most devices using TENG mechanism always have overly thickness size which even reach to centimeter scales but still perform so poorly on the electrical output efficiency. Hence it is eager to have an ultrathin triboelectric nanogenerator assembly that will overcome or substantially ameliorate at least one or more of the deficiencies of a prior art, or to at least provide an alternative solution to the problems. It is to be understood that, if any prior art information is referred to herein, such reference does not constitute an admission that the information forms part of the common general knowledge in the art.

SUMMARY OF THE INVENTION

In order to solve the problem that the overly thickness of the conventional Triboelectric Nanogenerator and poor electrical output efficiency, the present invention provides an ultrathin nanogenerator assembly which is a triboelectric nanogenerator comprising: a positive electrical composite layer; a negative electrical composite layer and the positive electrical composite layer is electrically connected to the negative electrical composite layer; wherein: the positive electrical composite layer includes a positive element and a positive electrode laminated together; and the positive element is a foam material with thickness below 90 μm and pore size below 60 μm; and the negative electrical layer comprising a laminated negative element and a negative electrode.

In accordance, the present invention also provides another accepts of invention which is a sensor comprises the nanogenerator as rrientioned above.

In accordance, the present invention has the following advantages:

The present invention uses polyurethane (PU) foam material as a positive electrical layer. The porous foam body could facilitate electrons transferring when the surface contact of the positive and negative layers achieving a very thin and excellent electrical output effectiveness, and improving the conventional TENG with over thickness which limited this product for certain uses.

The present invention has verified that the difference between the thickness of the positive electrical layer and the applied force can have different electricity output. The present invention can be widely used in all kinds of applications like actuators or sensors, and can produce different electricity output according to different demands or purposes. Many of the attendant features and advantages of the present invention will become better understood with reference to the following detailed description considered in connection with the accompanying figures and drawings.

BRIEF DESCRIPTION OF THE DRAWINGS

The steps and the technical means adopted by the present invention to achieve the above and other objects can be best understood by referring to the following detailed description of the preferred embodiments and the accompanying drawings.

FIG. 6A and.

FIG. 5A and 8B are relationship between applied force, voltage and current of 90 μm embodiment in accordance with the present invention;

DETAILED DESCRIPTION OF THE PREFERRED EMBODIMENTS

Figure 1:
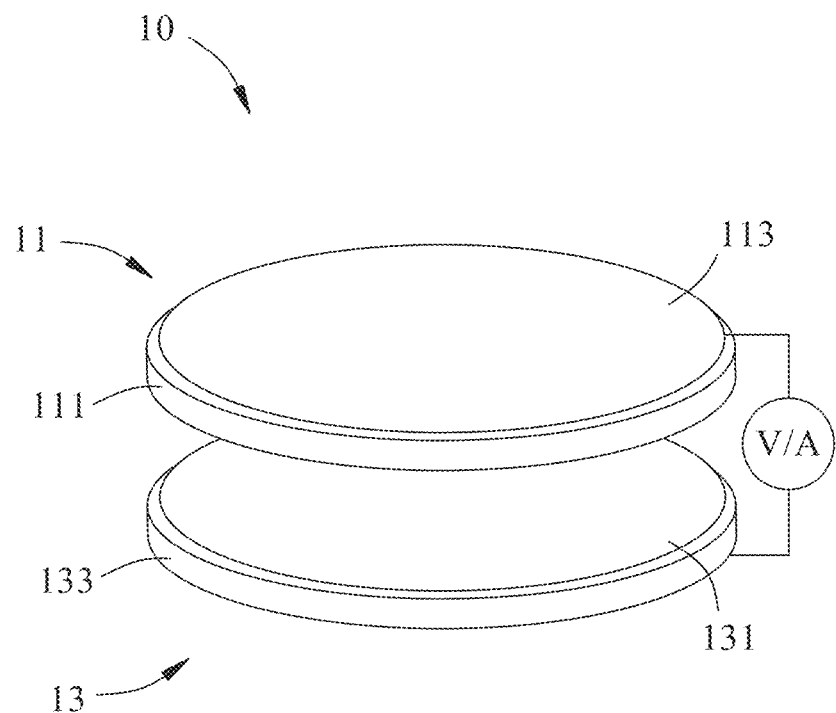
FIG. 1 is a preferred embodiment of the TENG in accordance with the present invention.

Reference will now be made in detail to the present preferred embodiments of the invention, examples of which are illustrated in the accompanying drawings. Wherever possible, the same reference numbers are used in the drawings and the description to refer to the same or like parts, It is not intended to limit the method by the exemplary embodiments described herein, In the following detailed description, for purposes of explanation, numerous specific details are set forth in order to attain a thorough understanding of the disclosed embodiments. It will be apparent, however, that one or more embodiments may be practiced without these specific details. As used in the description herein and throughout the claims that follow, the meaning of "a", "an", and "the" may include reference to the plural unless the context clearly dictates otherwise. Also, as used in the description herein and throughout the claims that follow, the terms "comprise or comprising", "include or including", "have or having", "contain or containing" and the like are to be understood to be open-ended, i.e., to mean including but not limited to.

With reference to FIG. 1, a first embodiment of the present invention provides a nanogenerator assembly 10 which is also an ultrathin triboelectric nanogenerator comprising a positive electrical composite layer 11, a negative electrical composite layer 13. The positive electrical composite layer 11 is electrically connected to the negative electrical composite layer 13. The positive electrical composite layer 11 includes a positive element 111 and a positive electrode 113 laminated together. The negative electrical layer 13 comprising a laminated negative element 131 and a negative electrode 133.

The positive element 111 in the positive electrical composite layer 11 is preferably to be a polyurethane (PU) foam material in this preferred embodiment which has a porous structure with a thickness of at a range of 5 to 90 μm, preferably 5 ~40 μm, more preferably 5~30 μm, especially 5~20 μm. The pore size is preferred to be at a range between 15 to 60 μm, preferably 15 to 30 μm, especially 15 μm. As conclusion, the thickness of the positive electrical layer 11 of the present invention is preferably to be thinner, and the pore size is smaller to have a more promising function and performance. More preferably, the amount of pore in the PU foam material is preferred to be as much as it could to have a better effectiveness of the Nanogenerator assembly 10 of the present invention. The positive electrode 113 is preferably copper. The above negative electrical layer 13 comprises a laminated negative element 131 and is preferably a polytetrafluoride material (PTFE) material in the preferred embodiment, having a thickness of 100 to 300 μm, preferably 150 to 250 μm, and the negative electrode 133 is preferably an aluminum electrode.

When the Nanogenerator assembly 10 provided in this embodiment remains unused or haven't been operated, the positive electrical composite layer 11 and the negative electrical composite layer 13 are facing each other with the positive element 111 and the negative element 131 untouched or non-contacted. The positive electrode 113 and the negative electrode 133 are otherwise electrically connected with each other.

The material of the positive electrical layer 111 and the negative electrical layer 131 are chosen to have or carry opposite charges, such as the aforementioned PU foam material as the positive element 111 to generate positive charge, and the PTFE material is contrary to have or generate negative charge. As such, when the positive element 111 as PU foam material is contacted with the negative element 131 as PTFE material, an electrical current will be formed or generated by the positive and negative charges contacted. The positive and negative electrodes 113, 133 is primary to be as copper electrode and the aluminum electrode. However, by utilizing different suitable electrode material will produce different electrical outputs as shown in chart 1 below.

CHART 1

| Type of electrode | Voltage (V) | | Current (uA) | |
| --- | --- | --- | --- | --- |
| | Maximum | Minimum | Maximum | Minimum |
| Copper electrode on both sides | 2.16 | −1.64 | 0.03 | −0.023 |
| Aluminum electrode on both sides | 16.23 | −11.81 | 0.363 | −0.252 |
| Copper electrode as positive electrode and aluminum electrode as negative electrode | 29.92 | −26.57 | 0.948 | −0.621 |

On the other hand, the material for the positive element 111 and the negative element 131 are optionally available as follows:

CHART 2

| The positive element | The negative element |
| --- | --- |
| Polyurethane | Sorbothane |
| Magnesium fluoride | Paper |
| Nylon | Wood |
| Glass | Nitrile rubber |
| Cotton | Polycarbonate |
| PET solid | ABS |
| | Acrylic (polymethyl methacrylate) |
| | Epoxy |
| | Styrene-butadiene rubber (SBR, Buna S) cloth |
| | EVA rubber for gaskets, filled |
| | Polystyrene |
| | Polyimide |
| | Silicones |
| | Olefins (alkenes): LDPE, HDPE, PP |
| | Cellulose nitrate |
| | PVC |
| | Latex, natural rubber |

Figure 2:
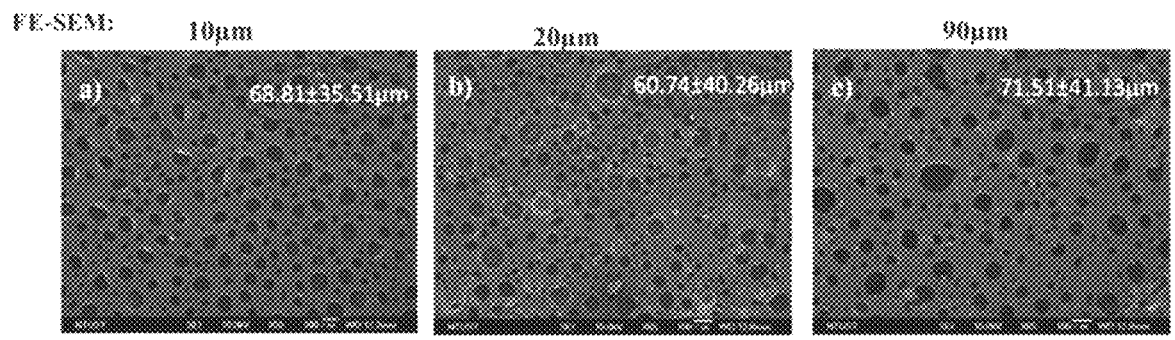
FIG. 2 and FIG. 3 are SEM results of multiple preferred embodiment in accordance with the present invention.
Figure 3:
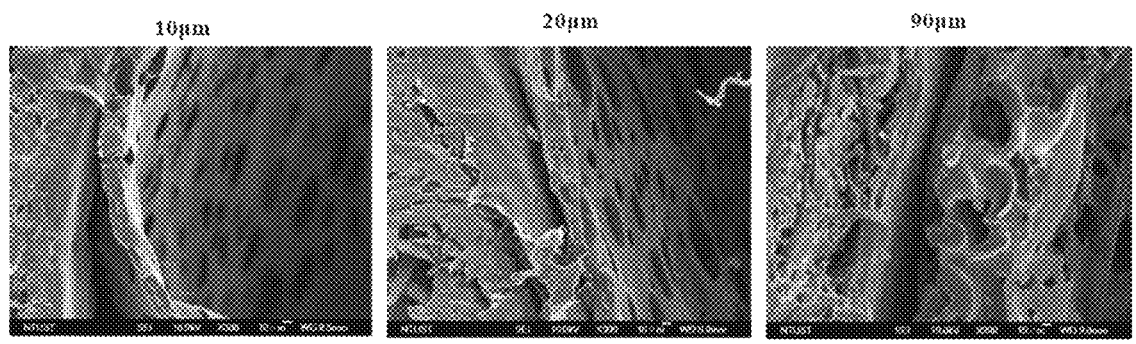

With reference to FIG. 2 and FIG. 3, a preferred embodiment of the positive element 111 of the present invention is a PU foam material, and its thickness is in a condition of very or ultra-thin and has multiple pores/cells, and the pores/cells are uniformly distributed within the positive element 111. The positive element 111 is ultra-thin and is flexible. Furthermore, the present invention provides multiple embodiments with different thickness of the positive element 111 for various validation tests. All the samples are made to have the positive element 111 facing the negative element 131 in distance of 0.5 mm before operated.

Figure 4:
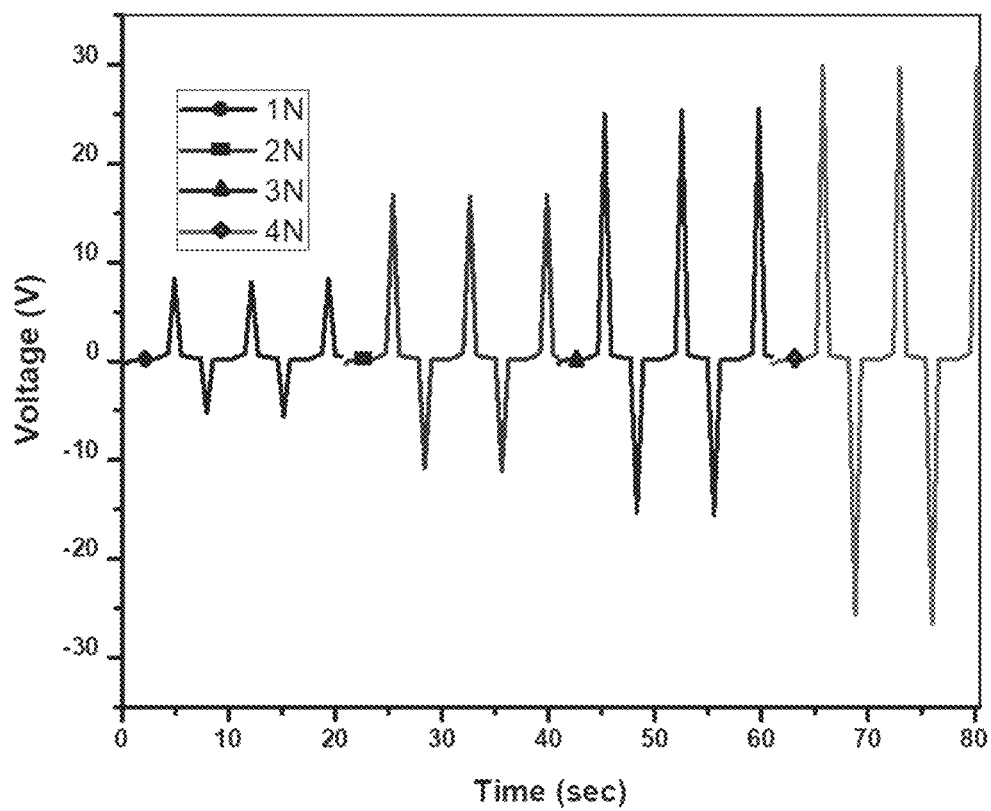
FIG. 4 is a relationship between applied force and voltage of 5 μm embodiment in accordance with the preset invention.

First, the positive element 11 is applied with different force in a range of 1N (Newton force) to 4N to be contacted with the negative element 131. The resulting voltage value will be measured. With reference to FIG. 4, it is an illustration of relationship between the applied force and outputting voltage using the embodiment with the positive element 111 having its thickness in 5 μm and pore size in 15 μm. As shown in FIG. 4, it is proven that as the applied force increased, a promising voltage outputting will be obtained by the present invention. It is worth noticed that the embodiment in FIG. 4 is the most promising embodiment with best performance provided by the present invention.

Figure 5A:
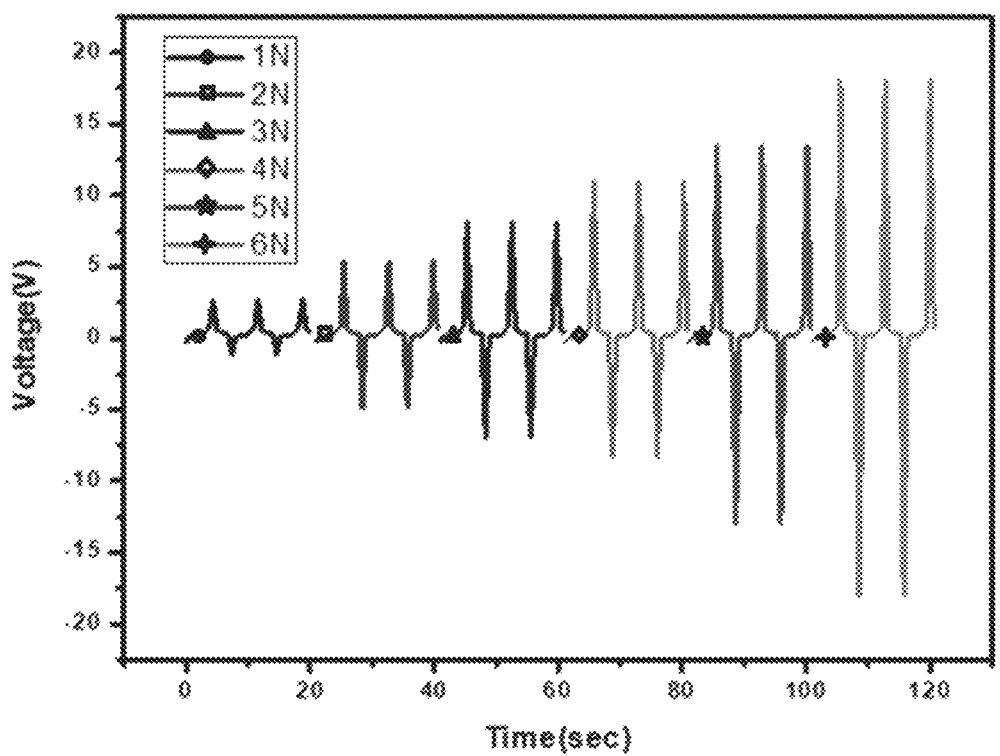
FIG. 5A to FIG. 5D are relationship between applied force, voltage and current of 10 μm embodiment in accordance with the present invention.
Figure 5B:
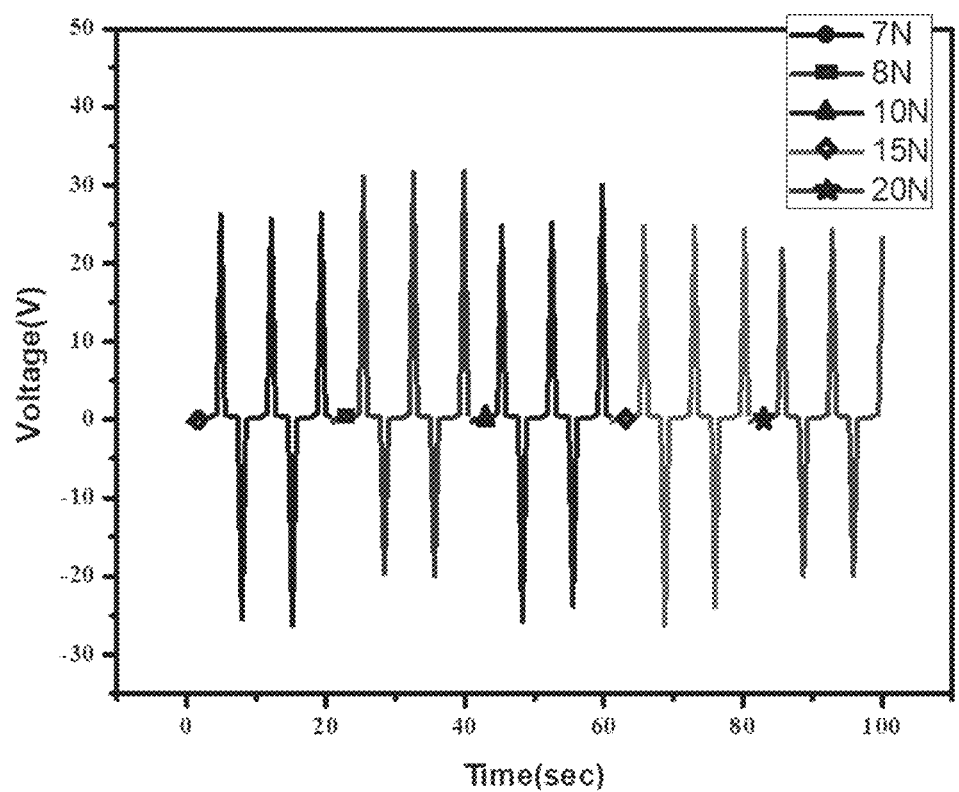
Figure 5C:
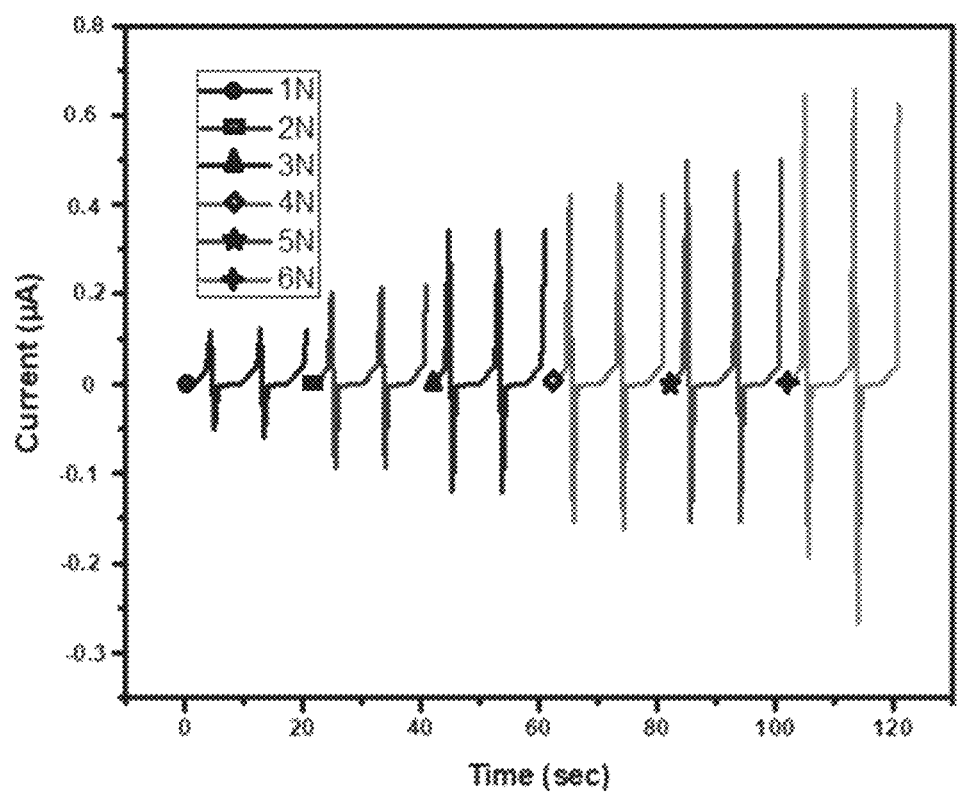
Figure 5D:
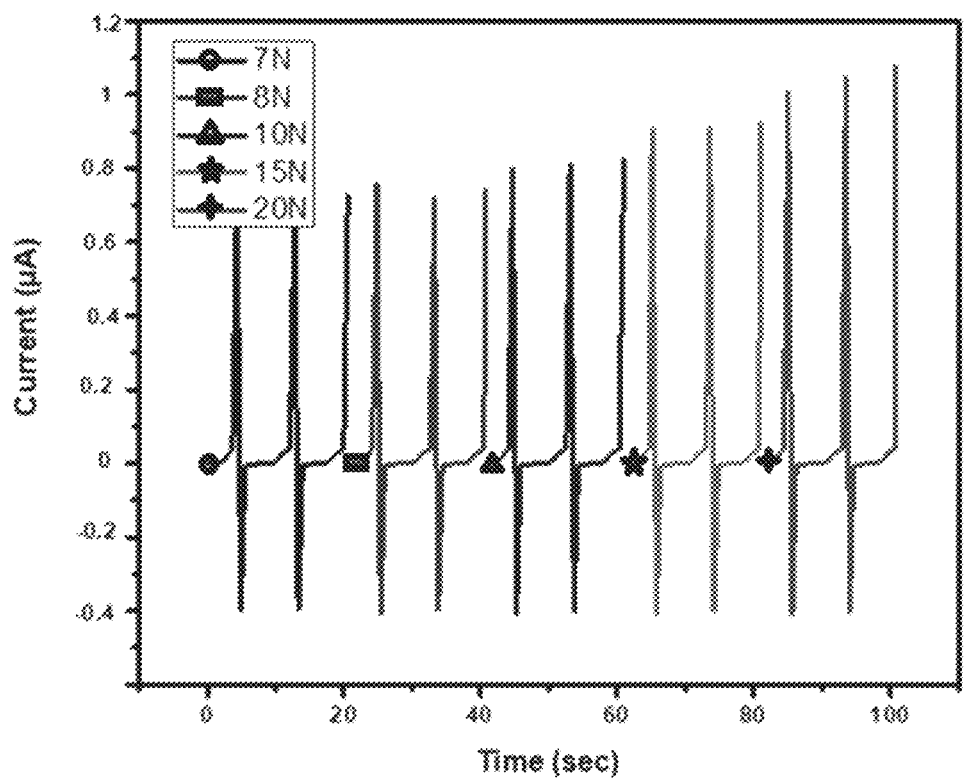

Next, with reference to FIG. 5A to 5B, these are an illustration for the relationship between the applied force and voltage outputting from the embodiment with the positive element 111 having its thickness to be 10 μm and also an illustration for the relationship between the applied force and current outputting as shown in FIG. 5C to 5D. According to the results shown in FIG. 5A to 5B, it is observed that the voltage is increased as the applied force between 1N to 8N to be increased. As the applied force becomes in a range of 8N to 20N, it is observed that the voltage output is slightly decreased within this range but still remain reasonable voltage output. The current performance otherwise is stably increased as the applied force increased between 1N to 20N.

Figure 6A:
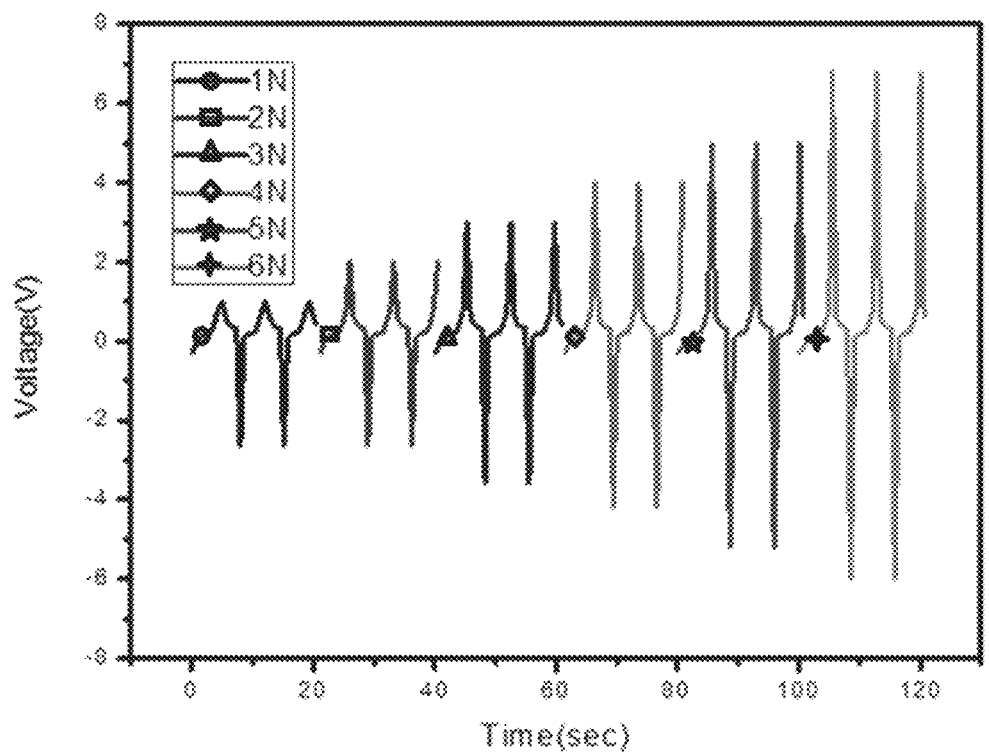
Figure 6B:
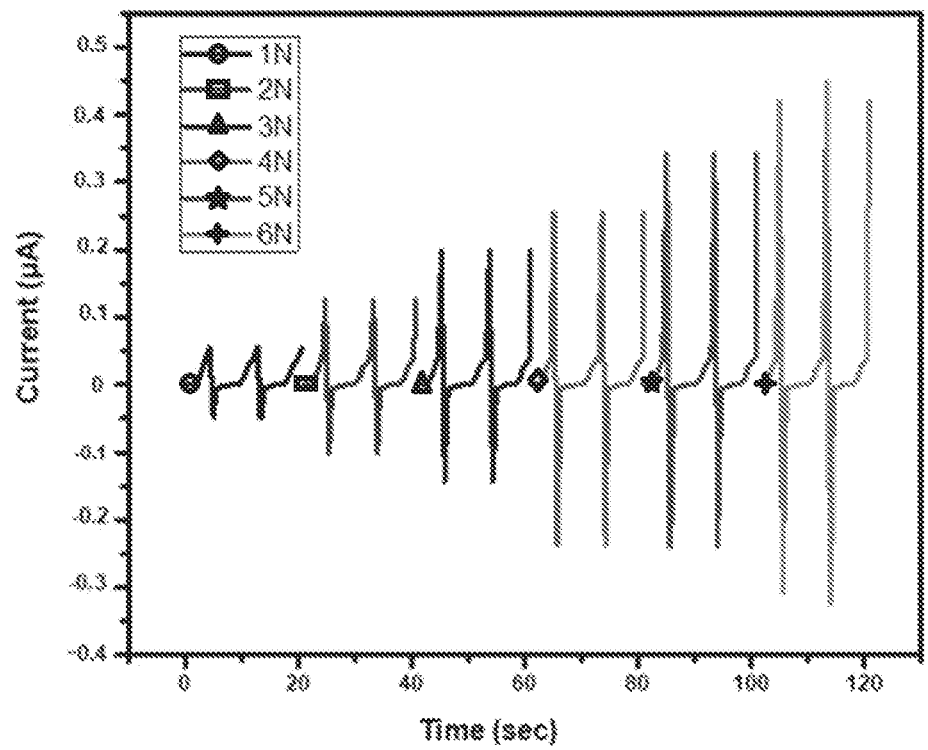
FIG. 6B are relationship between applied force, voltage and current of 20 μm embodiment in accordance with the present invention.

With reference to FIGS. 6A and 6B, these are an illustration for the relationship between the applied force and voltage outputting from the embodiment with the positive element 111 having its thickness to be 20 μm. As shown in FIGS. 6A and 6B, it is observed that both the voltage and current output are increased as the applied force between 1N to 6N to be increased.

Figure 7:
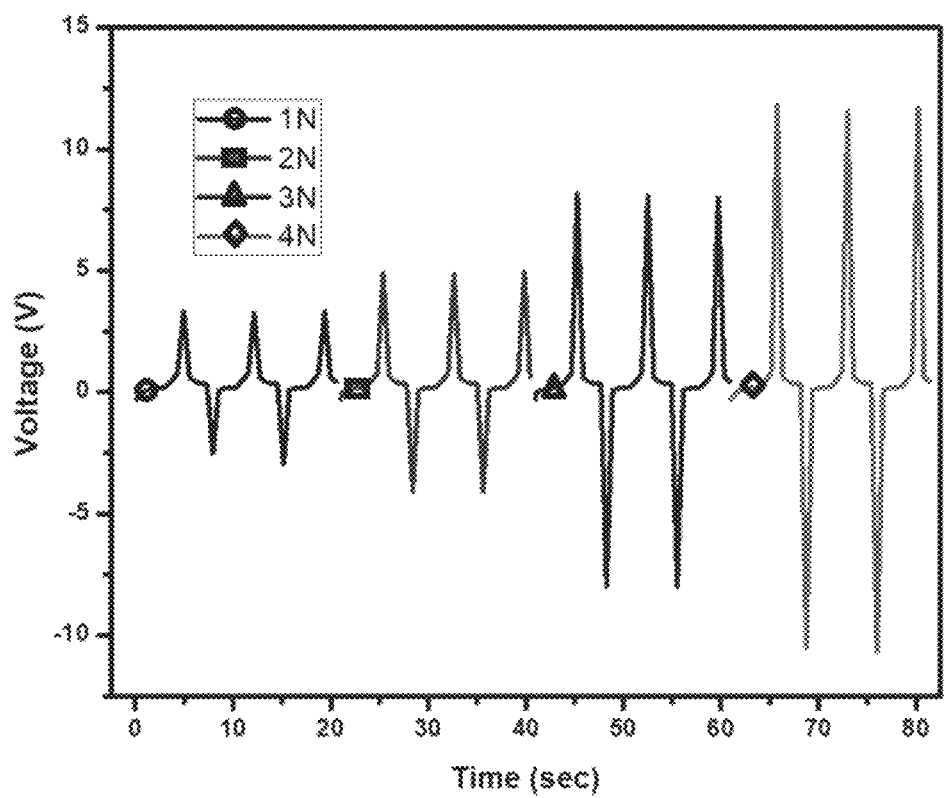
FIG. 7 is a relationship between applied force and voltage of 40 μm embodiment in accordance with the present invention.

With reference to FIG. 7, it is an illustration for the relationship between the applied force and voltage outputting from the embodiment with the positive element 111 having its thickness to be 40 μm. As shown in FIG. 7, it is observed that the voltage output is increased as the applied force between 1N to 4N to be increased.

Figure 8A:
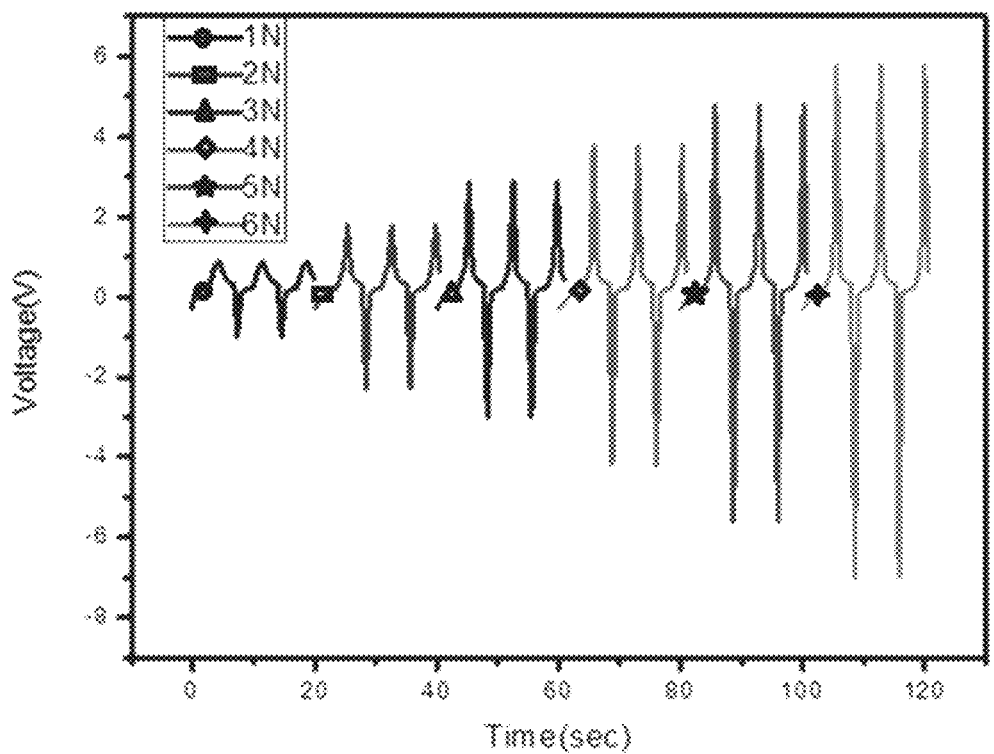
Figure 8B:
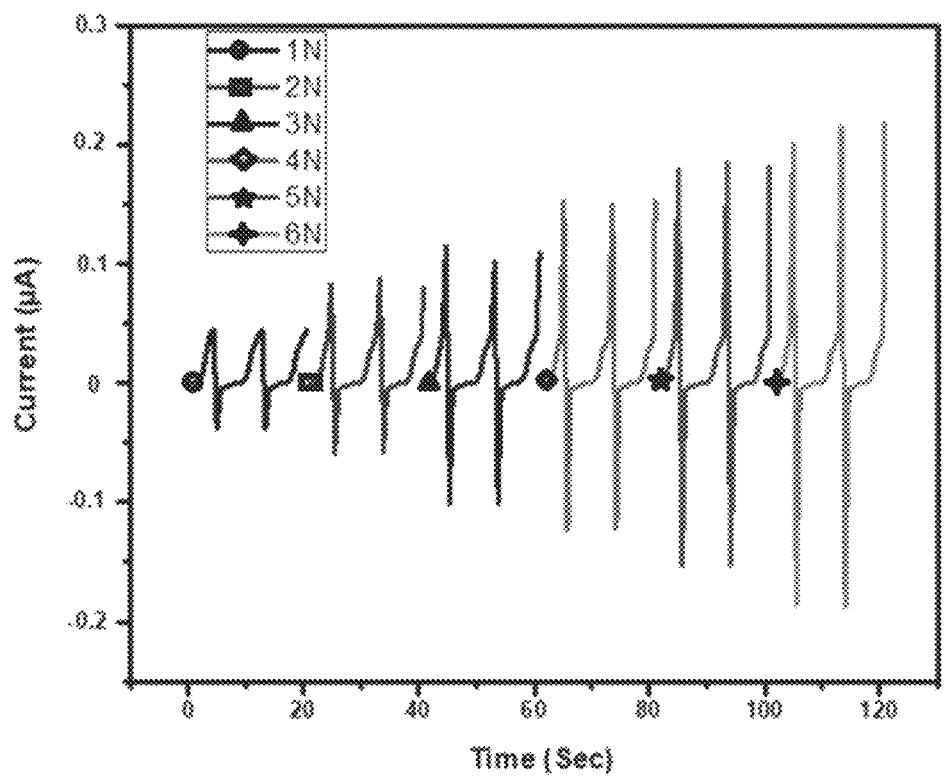

With reference to FIG. 8, it is an illustration for the relationship between the applied force and voltage and also current outputting from the embodiment with the positive element 111 having its thickness to be 90 μm. As shown in FIG. 8, it is observed that both the voltage and current output are increased as the applied force between 1N to 6N to be increased.

Figure 9A:
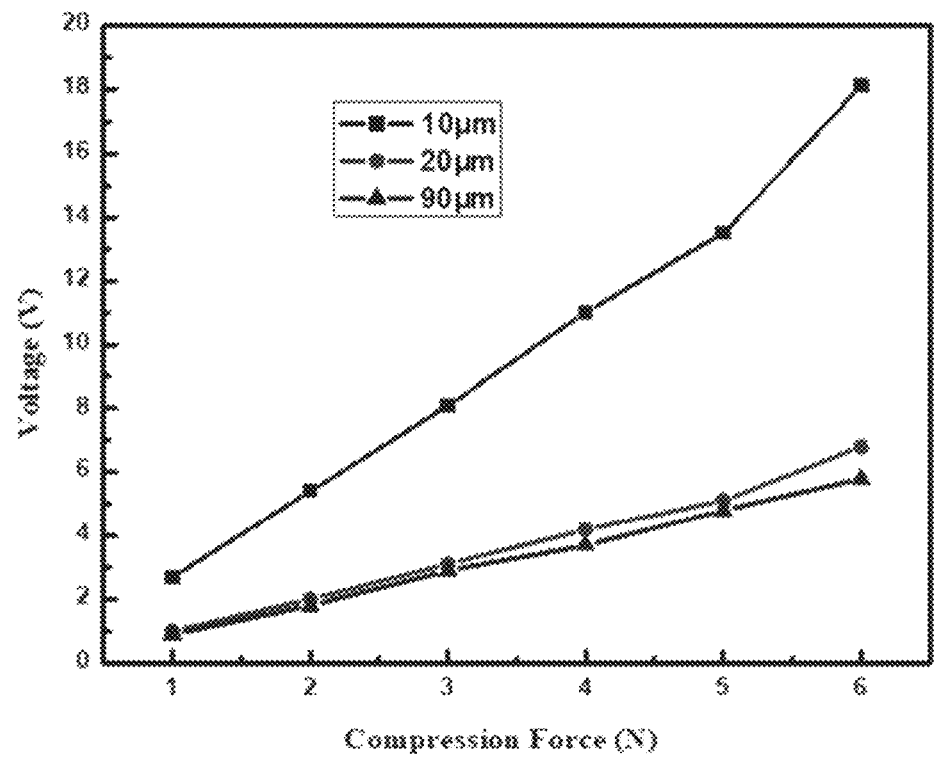
FIG. 9A to 9C are comparation of applied force, voltage and current of preferred embodiments with different thickness in accordance with the present invention.
Figure 9B:
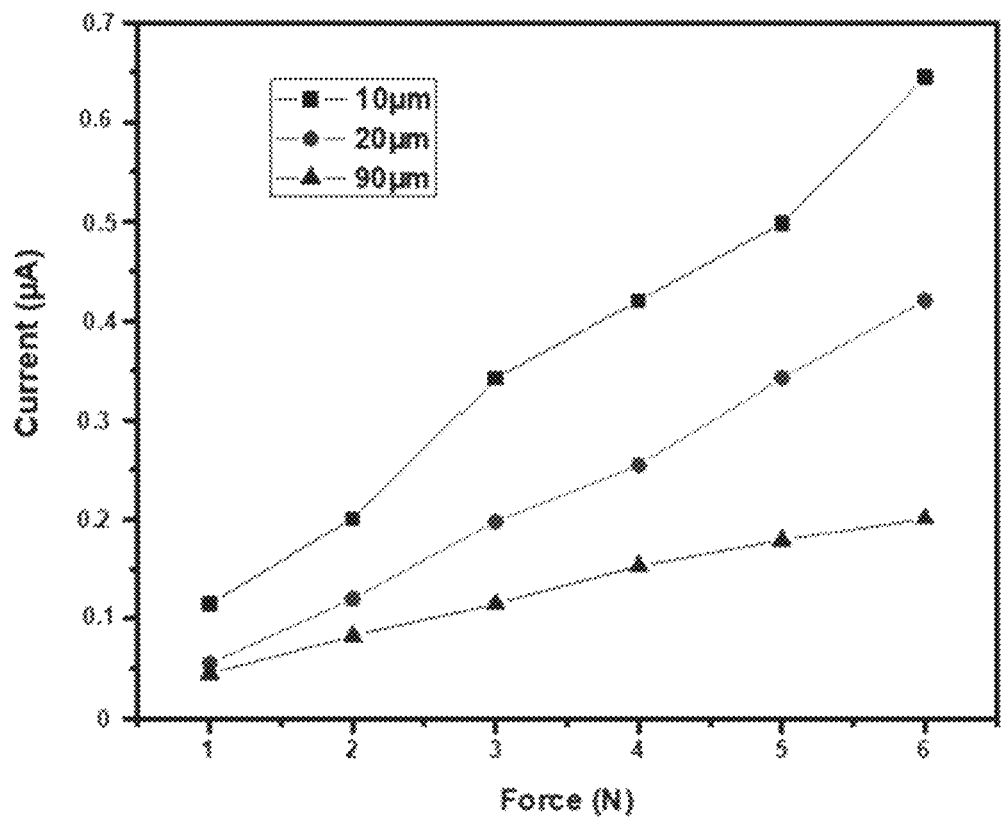
Figure 9C:
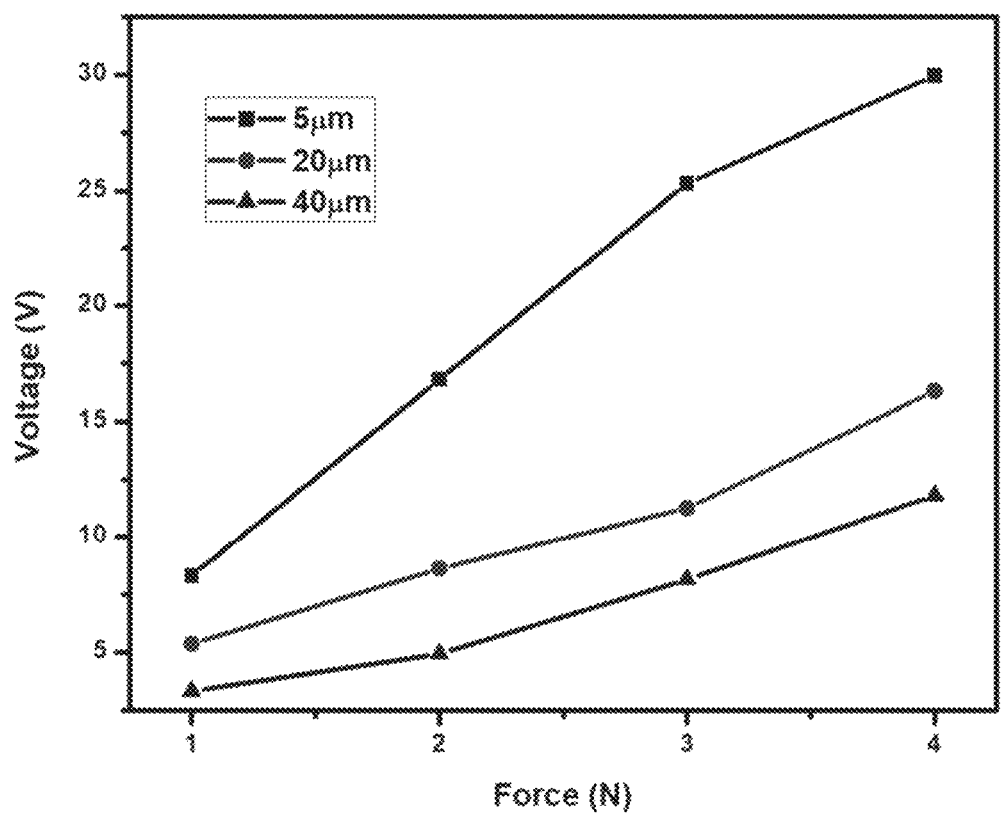

In comparing the relationship of voltage outputting and the applied force within all the embodiments with different thickness as mentioned above, the comparison are shown in FIGS. 9A to 9C. In conclusion that the voltage and current output are always or intended to be increased as the applied force increased. However, the embodiments with thickness at 5 μm and 10 μm have better performance in which a conclusive result could be given that the present invention can provide an ultra-thin Nanogenerator assembly 10 having a good electrical output performance.

Figure 10A:
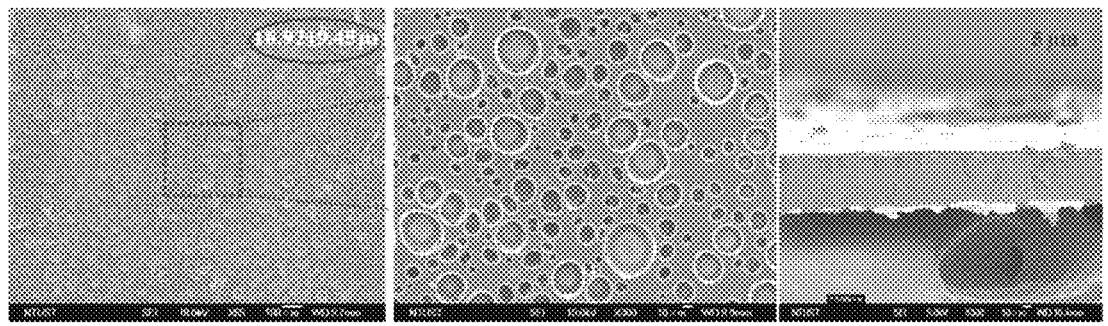
FIG. 10A to 10C are surface and cross-section view of PU foam material in the thickness of 5, 20 and 40 μm in accordance with the present invention; and FIG. 11A
Figure 10B:
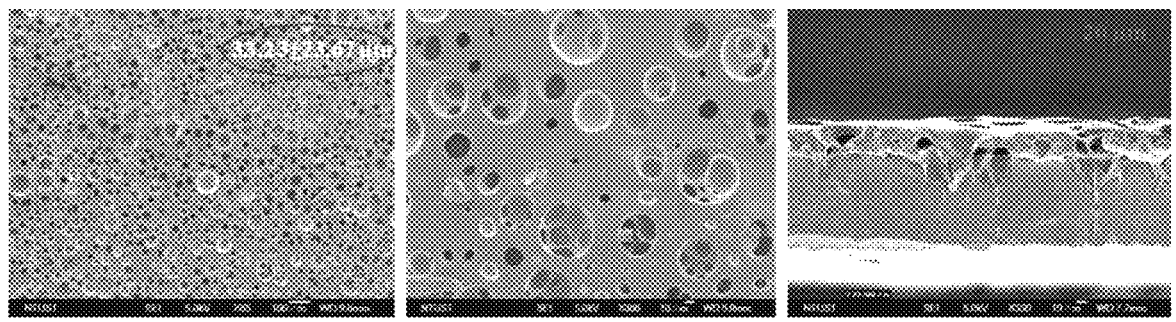
Figure 10C:
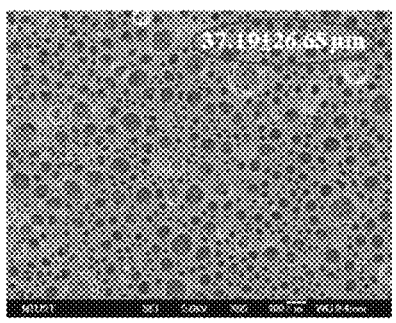
Figure 10C:
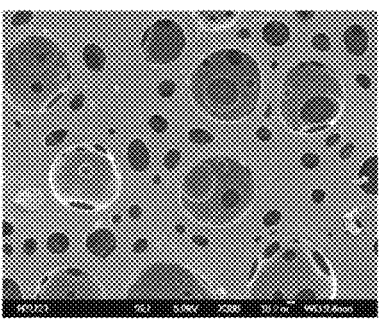
Figure 10C:
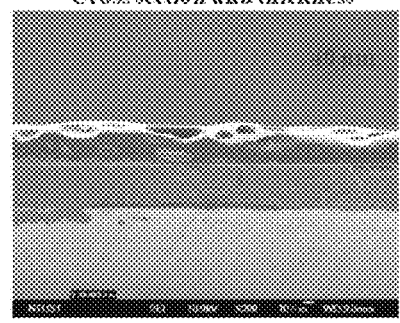
Figure 11A:
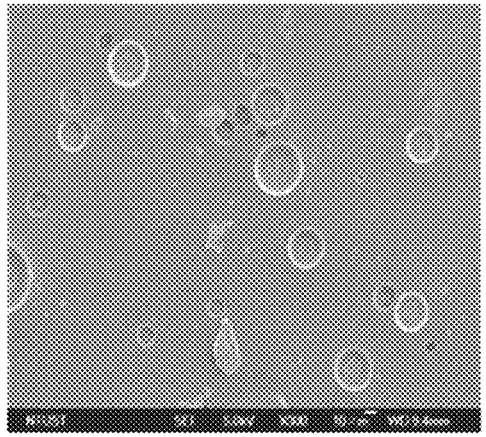
FIG. 11B is a SEM showing different porous rate of PU foam material in the thickness of 5 μm in accordance with the present invention.
Figure 11B:
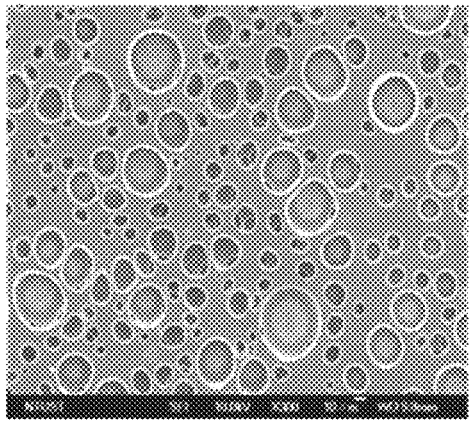

Further, the thickness of the PU foam material of the positive element 11 provides several different implementation examples and confirming its effectiveness as followings, With reference to FIGS. 10A, 10B, 10C, these figures are surface and cross-section observation of the PU foam material as the positive element 111 having the thickness of 5, 20, 40 μm respectively. With reference to FIG. 11A and FIG. 11B, these are electrical outputting performance between the embodiment with PU foam. as the positive element 111 having its thickness of 5 μm with different porosity. As result, when the porosity is low in the positive element 111, the electrical output will be enhanced. In conclusion, with lower or fewer porosity to the ultra-thin Nanogenerator assembly 10 provided by the present invention, a better or more promising electrical output could be obtained.

CHART 3

| PU foam layer | Voltage outputting (V) | | Current outputting (uA) | |
|---|---|---|---|---|
| | Maximum | Minimum | Maximum | Minimum |
| 5 μm in thickness with fewer amount of pores | 1.84 | −1.76 | 0.0203 | −0.0050 |
| 5 μm in thickness with more amount of pores | 29.92 | 26.57 | 0.948 | −0.621 |

The above specification, examples, and data provide a complete description of the present disclosure and use of exemplary embodiments. Although various embodiments of the present disclosure have been described above with a certain degree of particularity, or with reference to one or more individual embodiments, those with ordinary skill in the art could make numerous alterations or modifications to the disclosed embodiments without departing from the spirit or scope of this disclosure.

What is claimed is:

1. A nanogenerator comprising:
   a positive electrical composite layer;
   a negative electrical composite layer and the positive electrical composite layer is electrically connected to the negative electrical composite layer; wherein:
   the positive electrical composite layer includes a positive element and a positive electrode laminated together; and the positive element is a foam material with thickness below 90 μm and pore size below 60 μm; and
   the negative electrical layer comprising a laminated negative element and a negative electrode.

2. The nanogenerator as claimed in claim 1, wherein material of the positive electrical layer and the negative electrical layer carry opposite electrical charges.

3. The nanogenerator as claimed in claim 2, wherein the material of the positive element comprises Polyurethane, Magnesium fluoride, Nylon, Glass, Cotton, or PET solid.

4. The nanogenerator as claimed in claim 2, wherein the positive electrode comprises copper.

5. The nanogenerator as claimed in claim 4, wherein the negative electrode comprises aluminum.

6. The nanogenerator as claimed in claim 2, wherein the negative electrode comprises aluminum.

7. The nanogenerator as claimed in claim 2, wherein an electrical output is generated by contacting the positive element and the negative element.

8. The nanogenerator as claimed in claim 1, wherein a material of the positive element comprises Polyurethane, Magnesium fluoride, Nylon, Glass, Cotton, or PET solid.

9. The nanogenerator as claimed in claim 1, wherein a material of the negative element comprises Sorbothane, paper, wood, nitrile rubber, polycarbonate, ABS, Acrylic, Epoxy, Styrene-butadiene rubber, cloth, EVA rubber for gaskets, Polystyrene, Polyimide, Silicones, LDPE, HDPE, PP, cellulose nitrate, PVC or natural rubber.

10. The nanogenerator as claimed in claim 1, wherein a material o he negative element comprises Sorbothane, paper, wood, nitrile rubber, polycarbonate, ABS, Acrylic, Epoxy, Styrene-butadiene rubber, cloth, EVA tubber for gaskets, Polystyrene, Polyimide, Silicones, LDPE, HDPE, PP, cellulose nitrate, PVC or natural rubber.

11. The nanogenerator as claimed in claim 1, wherein the positive electrode comprises copper.

12. The nanogenerator as claimed in claim 1, wherein the negative electrode comprises aluminum.

13. The nanogenerator as claimed in claim 1, wherein an electrical output is generated by contacting the positive element and the negative element.

14. A sensor comprises the nanogenerator as claimed in claim 1.

* * * * *